(12) United States Patent
Wu et al.

(10) Patent No.: US 8,276,182 B2
(45) Date of Patent: Sep. 25, 2012

(54) TELEVISION CONTENT FROM MULTIPLE SOURCES

(75) Inventors: Haoyun Wu, Redmond, WA (US); Min Liu, Redmond, WA (US); Ashley C. Speicher, Redmond, WA (US); Zhen Ma, Redmond, WA (US); Hui Wan, Beijing (CN); Thomas Meng, Beijing (CN); Shuyin Zhao, Sammamish, WA (US); Feng Lu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 451 days.

(21) Appl. No.: 12/246,290

(22) Filed: Oct. 6, 2008

(65) Prior Publication Data

US 2009/0235321 A1 Sep. 17, 2009

Related U.S. Application Data

(60) Provisional application No. 61/036,436, filed on Mar. 13, 2008.

(51) Int. Cl.
*H04N 7/173* (2011.01)
(52) U.S. Cl. ........... 725/110; 725/109; 725/112; 725/48
(58) Field of Classification Search .......... 725/109–110, 725/112, 48
See application file for complete search history.

(56) References Cited

U.S. PATENT DOCUMENTS

| | | | |
|---|---|---|---|
| 6,226,291 B1 | 5/2001 | Chauvel et al. | |
| 6,324,694 B1* | 11/2001 | Watts et al. | 725/32 |
| 6,571,392 B1* | 5/2003 | Zigmond et al. | 725/110 |
| 7,035,335 B1 | 4/2006 | Iacobelli et al. | |
| 7,058,721 B1 | 6/2006 | Ellison et al. | |
| 7,089,579 B1 | 8/2006 | Mao et al. | |
| 7,095,783 B1 | 8/2006 | Sotheran et al. | |
| 7,117,521 B2* | 10/2006 | Puthiyedath | 725/107 |
| 2002/0073423 A1* | 6/2002 | Krakirian | 725/40 |
| 2003/0046431 A1 | 3/2003 | Belleguie | |
| 2004/0268398 A1* | 12/2004 | Fano et al. | 725/88 |
| 2005/0021813 A1 | 1/2005 | Kovacevic et al. | |
| 2006/0288391 A1* | 12/2006 | Puthiyedath | 725/89 |

(Continued)

FOREIGN PATENT DOCUMENTS

EP 1051041 A1 11/2000

OTHER PUBLICATIONS

"IPTV", Retrieved at <<http://en.wikipedia.org/wiki/IPTV>>, Mar. 11, 2008, pp. 8.
MacAulay, et al., "Whitepaper—IP Streaming of MPEG-4: Native RTP vs MPEG-2 Transport Stream", Retrieved at <<http://www.envivio.com/pdf/RTPvsTS-v4.pdf>>, Oct. 2005, pp. 12.

(Continued)

*Primary Examiner* — Pankaj Kumar
*Assistant Examiner* — Mulugeta Mengesha
(74) *Attorney, Agent, or Firm* — Wolfe-SBMC

(57) ABSTRACT

Television content from multiple sources is described. In embodiment(s), a television client device includes an interface to receive television media content in multiple streaming video formats. A television media service implemented in the television client device can process television media content when received in a first streaming video format, and render the television media content for display. In addition, the television media service can process additional television media content when received in a second streaming video format, and render the additional television media content for display.

19 Claims, 5 Drawing Sheets

U.S. PATENT DOCUMENTS

2007/0074266 A1 3/2007 Raveendran et al.
2007/0174880 A1* 7/2007 Fite et al. .................. 725/87
2007/0285500 A1 12/2007 Ma et al.
2008/0313670 A1* 12/2008 Ho et al. .................... 725/34
2009/0003360 A1* 1/2009 Zhao et al. ................ 370/401
2009/0007174 A1* 1/2009 Fukuda et al. ............. 725/39

OTHER PUBLICATIONS

Borozdin, Mike, "DirectShow Movies in Direct3D Worlds", Retrieved at <<http://msdn2.microsoft.com/en-us/library/ms867211.aspx>>, Feb. 2003, pp. 9.

* cited by examiner

TELEVISION CONTENT FROM MULTIPLE SOURCES

RELATED APPLICATION

This application claims the benefit of a related U.S. Provisional Application Ser. No. 61/036,436 filed Mar. 13, 2008, entitled "Television Content from Multiple Sources", to Wu et al, the disclosure of which is incorporated by reference herein in its entirety.

BACKGROUND

A closed television system includes dedicated server(s) and client devices working together to distribute television media content from a content distributor to the subscribers of a television distribution service. Although a closed television system provides an efficient and dedicated distribution service, a network server distributes the television media content to the client devices as television media content in a proprietary video format. Similarly, the client devices are implemented to receive only the television media content that is distributed in the proprietary video format.

SUMMARY

This summary is provided to introduce simplified concepts of television content from multiple sources. The simplified concepts are further described below in the Detailed Description. This summary is not intended to identify essential features of the claimed subject matter, nor is it intended for use in determining the scope of the claimed subject matter.

Television content from multiple sources is described. In embodiment(s), a television client device includes an interface to receive television media content in multiple streaming video formats. A television media service implemented in the television client device can process television media content when received in a first streaming video format, and render the television media content for display. In addition, the television media service can process additional television media content when received in a second streaming video format, and render the additional television media content for display.

In other embodiment(s) of television content from multiple sources, television media content can be received from a content distributor in a first streaming video format, and additional television media content can be received from an Internet video service in a second streaming video format. The television client device can process the different streaming video formats of the television media content and the additional television media content, and render each different stream of television media content for display.

BRIEF DESCRIPTION OF THE DRAWINGS

Embodiments of television content from multiple sources are described with reference to the following drawings. The same numbers are used throughout the drawings to reference like features and components.

DETAILED DESCRIPTION

Embodiments of television content from multiple sources provide that a television client device can receive and render television media content in any one of multiple streaming video formats. A television client device can receive video media content formatted for distribution via the Internet, television media content formatted for distribution from a proprietary system, and/or video and television media content formatted in other varying formats. A television media service can be implemented to receive the streaming video and/or television media content (e.g., which is also video media content), and process the video and/or television media content to be rendered for display at any television client device.

While features and concepts of the described systems and methods for television content from multiple sources can be implemented in any number of different environments, systems, and/or various configurations, embodiments of television content from multiple sources are described in the context of the following example systems and environments.

Figure 1:
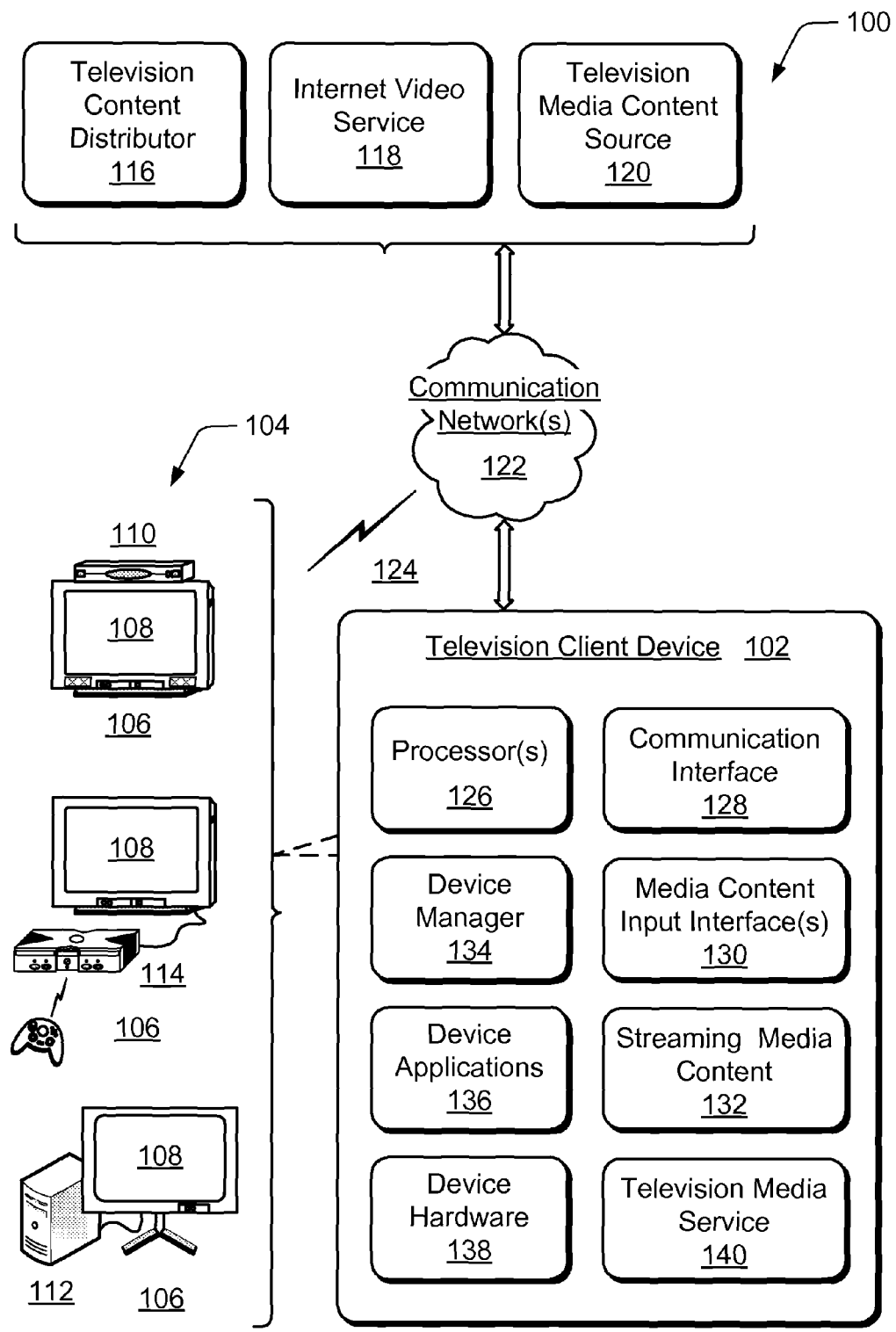
FIG. 1 illustrates an example system in which embodiments of television content from multiple sources can be implemented.

FIG. 1 illustrates an example system 100 in which various embodiments of television content from multiple sources can be implemented. Example system 100 includes a television client device 102 that is implemented to receive television media content in different streaming video formats. The television client device 102 is an example of various television client devices 104 (e.g., wired and/or wireless client devices) that are implemented as components in various client systems 106. Each of the client systems 106 include a respective television client device and display device 108 that together render or playback any form of audio, video, and/or image content (e.g., described herein as any one or combination of media content, video content, television media content, and the like).

A display device 108 can be implemented as any type of a television, high definition television (HDTV), LCD, or similar display system. A television client device in a client system 106 can be implemented as any one or combination of a television client device 110 (e.g., a television set-top box, a digital video recorder (DVR), etc.), a computer device 112, a gaming system 114, an appliance device, an electronic device, and/or as any other type of client device that can be implemented to receive television media content in any form of audio, video, and/or image data in a media content distribution system.

Any of the television client devices described herein can be implemented with one or more processors, communication components, media content inputs, memory components, signal processing and control circuits, and a media content rendering system. A television client device can also be implemented with any number and combination of differing components as further described with reference to the example device shown in FIG. 5. A television client device may also be associated with a user or viewer (i.e., a person) and/or an entity that operates the device such that a client device describes logical devices that include users, software, and/or a combination of devices.

Example system 100 also includes sources that distribute television media content in different streaming video formats, such as a television content distributor 116, an Internet video service 118, and/or any other television media content source 120. In a media content distribution system, a television content distributor facilitates distribution of television media content, content metadata, and/or other associated data to multiple viewers, users, customers, subscribers, viewing systems, and/or client devices. The television content distributor 116 can receive television media content from various content sources, such as a content provider, an advertiser, a national television distributor, and the like. The content distributor can then communicate or otherwise distribute television media content and/or other data to any number of the various television client devices. In addition, the television content distributor 116 and/or the television media content source 120 can include a proprietary media content distribution system to synchronize asset and rights information for television client devices and/or subscribers to a media content distribution system, and can include a gateway to verify client rights.

Media content (e.g., to include recorded media content) can include any type of audio, video, and/or image media content received from any media content source. As described throughout, "media content" can include television programs (or programming), advertisements, commercials, music, movies, video clips, and on-demand media content. Other media content can include interactive games, network-based applications, and any other content (e.g., to include program guide application data, user interface data, advertising content, closed captions data, content metadata, search results and/or recommendations, and the like).

The television client device 102 and the sources that distribute television media content are each implemented for communication via communication network(s) 122 that can include any type of a data network, voice network, broadcast network, an IP-based network, and/or a wireless network 124 that facilitates data and/or voice communications. The communication network(s) 122 can be implemented using any type of network topology and/or communication protocol, and can be represented or otherwise implemented as a combination of two or more networks. Any one or more of the arrowed communication links facilitate two-way data communication, such as from the television client device 102 to the television content distributor 116 and vice-versa.

In this example, television client device 102 includes one or more processors 126 (e.g., any of microprocessors, controllers, and the like), a communication interface 128 for data communications, and/or media content input interface(s) 130 to receive streaming media content 132, such as television media content in different streaming video formats. Television client device 102 also includes a device manager 134 (e.g., a control application, software application, signal processing and control module, etc.), device applications 136 (e.g., code that is native to a particular device), and/or device hardware 138 (e.g., a hardware abstraction layer for a particular device).

Television client device 102 also includes a television media service 140 that can be implemented as computer-executable instructions and executed by the processors 126 to implement various embodiments and/or features of television content from multiple sources. In various embodiments, the television media service 140 can be implemented as several components or modules distributed to implement the embodiments described herein.

The television client device 102 can receive television media content in different streaming video formats (e.g., streaming media content 132). For example, television media content can be received from the television content distributor 116 in a first streaming video format, and video media content can be received from the Internet video service 118 in a second streaming video format. In various embodiments, television media content can be received in an RTSP (real-time streaming protocol) delivery format, an HTTP (hypertext transfer protocol) delivery format, an H.264 video format (also known as MPEG-4 part 10 and AVC), an MPEG-2 video format, and/or a VC1/WMV video format.

The television media service 140 can then process the television media content frame-by-frame as received in any of the streaming video formats, and render the television media content for display. In various embodiments, the television media service 140 can include different processing code to determine frames of the television media content when received in the different streaming video formats. The television media service 140 can determine the frame boundaries of the television media content that is received in the different streaming video formats (e.g., the different video formats involve different processing code implemented at the television client device).

In other embodiments, the television media service 140 can be implemented to demux the television media content when received into video elements, audio elements, and payload elements (also referred to as a data element). The television media service 140 can also be implemented to error check for frames of the television media content when received in different streaming video formats, and initiate a request for missing data packets of video, audio, and/or payload elements. In other embodiments, the television media service 140 can be implemented to determine the PTS (presentation time stamp) for each frame of the television media content that is received in an RTSP (real-time streaming protocol) delivery system.

Figure 2:
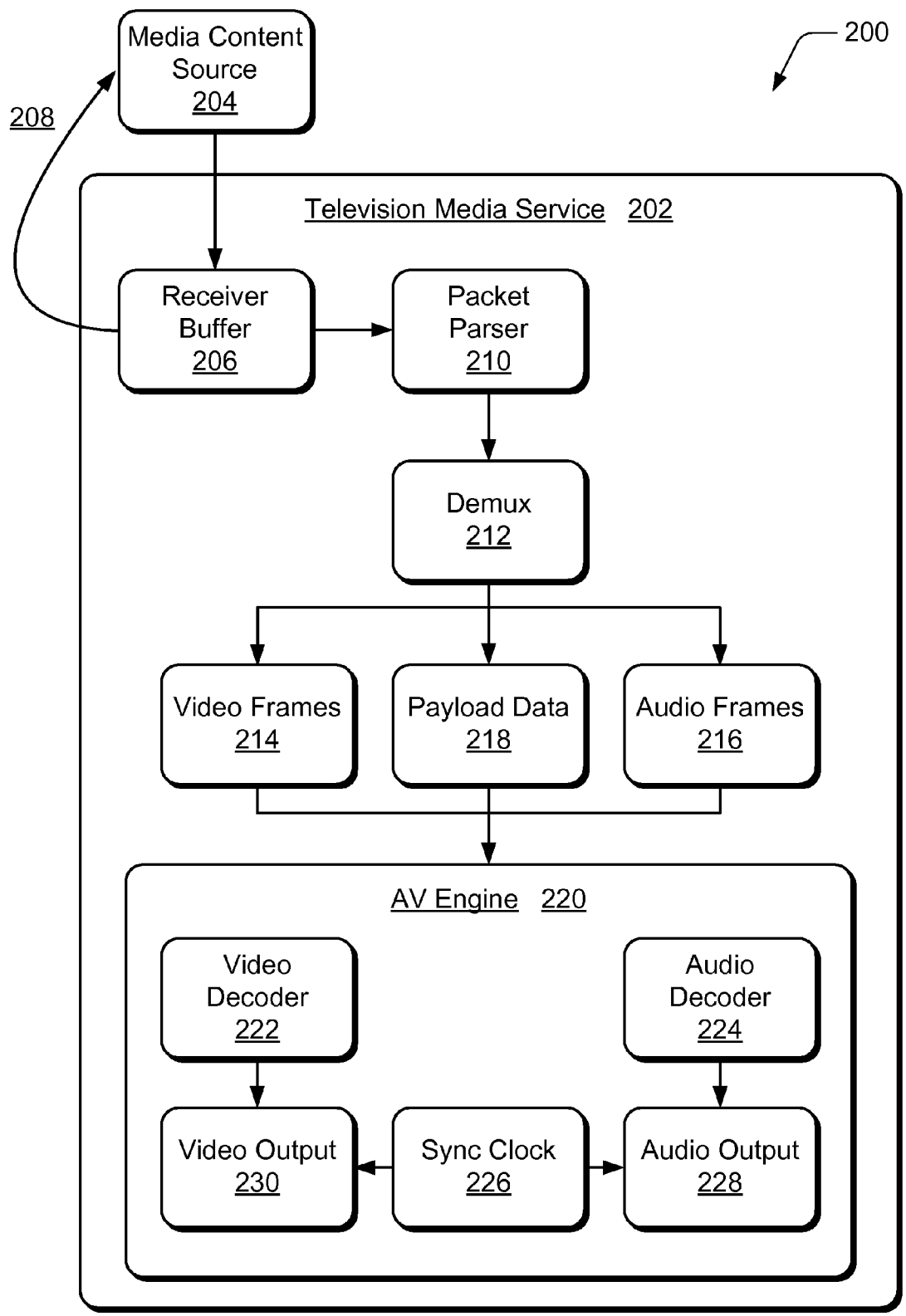
FIG. 2 illustrates another example system in which embodiments of television content from multiple sources can be implemented.

FIG. 2 illustrates an example system 200 that includes a television media service 202 to implement various embodiments of television content from multiple sources. Television media service 202 is an example of the television media service 140 that is implemented in television client device 102 and described with reference to FIG. 1. Example system 200 includes a media content source 204 that distributes television media content and/or video media content to a television client device in different streaming video formats. The television media service 202 (e.g., at a television client device) receives the television media content when the television client device is tuned to receive streaming video. Example system 200 illustrates an overview of receiving, processing, and rendering television media content when received in any one of different, multiple streaming video formats.

When a tune request is initiated at a television client device (e.g., when a subscriber or user initiates a request to access a video stream, such as from an Internet service), a URL is obtained and utilized to connect to a server, such as an RTSP server that supports the RTSP delivery system. The media content source 204 can then communicate the requested stream of video media content via an RTP (real-time transport protocol) to the television client device that includes the television media service 202.

The television media service 202 includes a receiver buffer 206 that can be implemented as a circular buffer to receive the incoming UDP packets which may not be received in sequential order, and some packets may be lost. When a lost packet is detected, an RTSC protocol can be utilized to request missed or lost packets at 208 from the media content source 204. A packet parser 210 is utilized of the parse the incoming packets and determine the frame boundaries based on the particular streaming video format.

The television media service 202 includes a demux 212 (e.g., a demultiplexer) that can separate the video frames 214 and the audio frames 216, and also set properties for the frames. The properties for a frame can include and indication of a video or audio frame, user data (e.g., closed caption data), a sequence header (e.g., binary data that indicates a video frame type as progressive or interlace), a frame version number, encoder type, color format, etc. Non-AV (audio/visual) frame data can also be received, such as closed caption payload data 218.

The television media service 202 includes an AV (audio/visual) engine 220 that includes a video decoder 222 (e.g., H.264, VC1, MPEG-2, etc.) and an audio decoder 224 (e.g., AC3, WMA, MPEG-2, etc.). Based on the frame properties, the video frames and audio frames can be processed to synchronously render the streaming video content for display. For example, in a WMV video stream, the sequence header is a four byte data block. For VC1 advanced profile encoded data, the sequence header can be derived from the private data section of the frame and constructed before being processed. The television media service 202 includes a sync clock 226 to sync the audio output 228 and the video output 230 based on PTS (presentation time stamps) which are set by the server when communicating the television media content or video data. The PTS (presentation time stamp) can be determined for each frame of the television media content that is received in an RTSP (real-time streaming protocol) delivery format.

Example methods 300 and 400 are described with reference to respective FIGS. 3 and 4 in accordance with one or more embodiments of television content from multiple sources. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. Example methods 300 and/or 400 may be described in the general context of computer-executable instructions, which can include software, applications, routines, programs, objects, components, data structures, procedures, modules, functions, and the like.

The method(s) may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
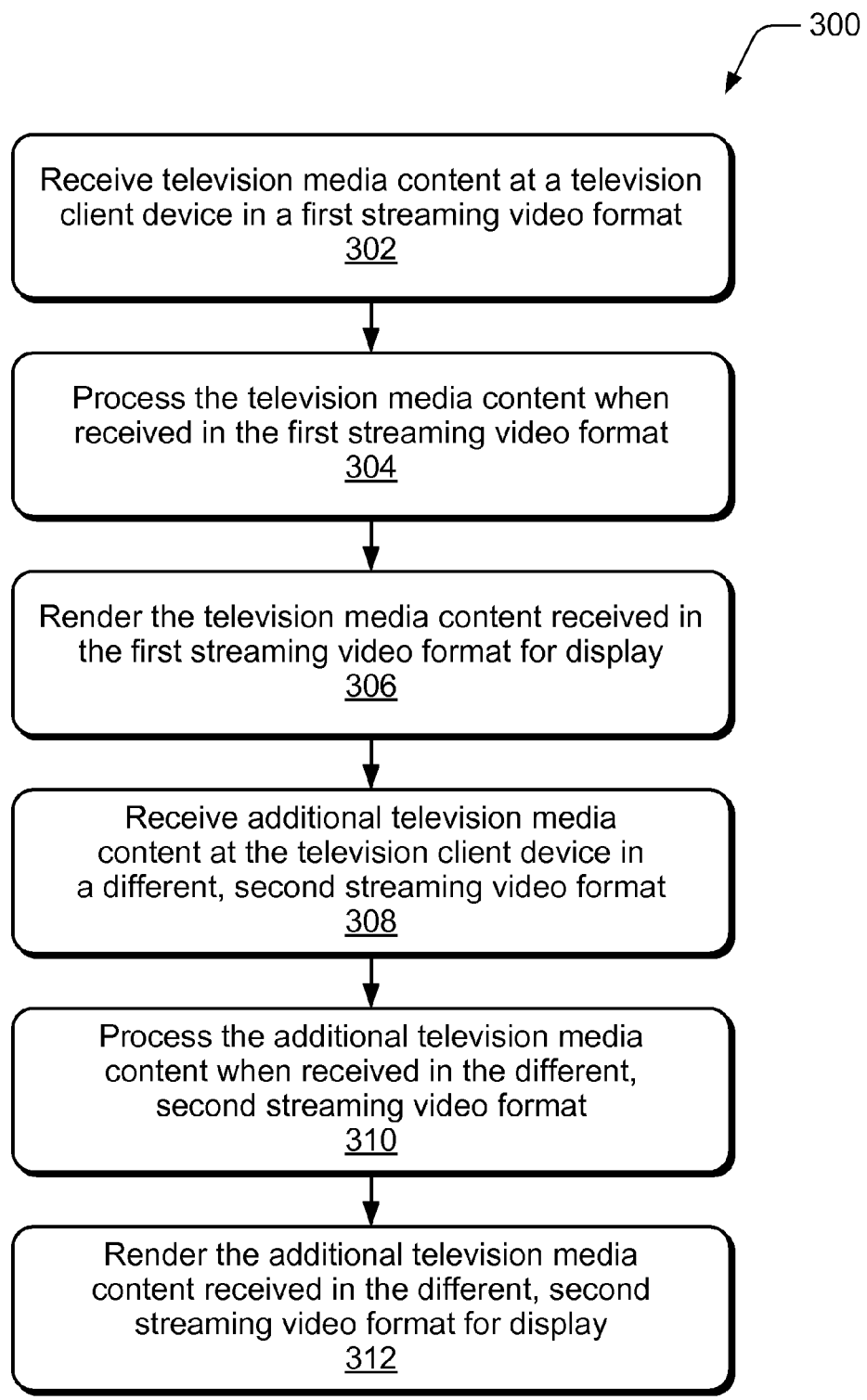
FIG. 3 illustrates example method(s) for television content from multiple sources in accordance with one or more embodiments.

FIG. 3 illustrates example method(s) 300 of television content from multiple sources. The order in which the method is described is not intended to be construed as a limitation, and any number of the described method blocks can be combined in any order to implement the method, or an alternate method.

At block 302, television media content is received at a television client device in a first streaming video format. For example, the television client device 102 (FIG. 1) receives television media content 132 from television content distributor 116 in a first streaming video format. The television client device 102 receives the television media content via a media content input interface 130.

At block 304, the television media content is processed when received in the first streaming video format and, at block 306, the television media content is rendered for display. For example, the television media service 140 at television client device 102 processes the television media content as received in the first streaming video format, and renders the television media content for display.

At block 308, additional television media content is received at the television client device in a different, second streaming video format. For example, the television client device 102 receives additional television media content in a second streaming video format (i.e., that is a different streaming video format than the television media content received in the first streaming video format). In an example, the television client device 102 receives the additional television media content as video content from the Internet video service 118 in the second streaming video format.

At block 310, the additional television media content is processed when received in the different, second streaming video format and, at block 312, the additional television media content is rendered for display. For example, the television media service 140 at television client device 102 processes the additional television media content as received in the second streaming video format, and renders the additional television media content for display. In various embodiments, the television media service 140 can be implemented to process television media content that is received in any one of multiple different streaming video formats.

Figure 4:
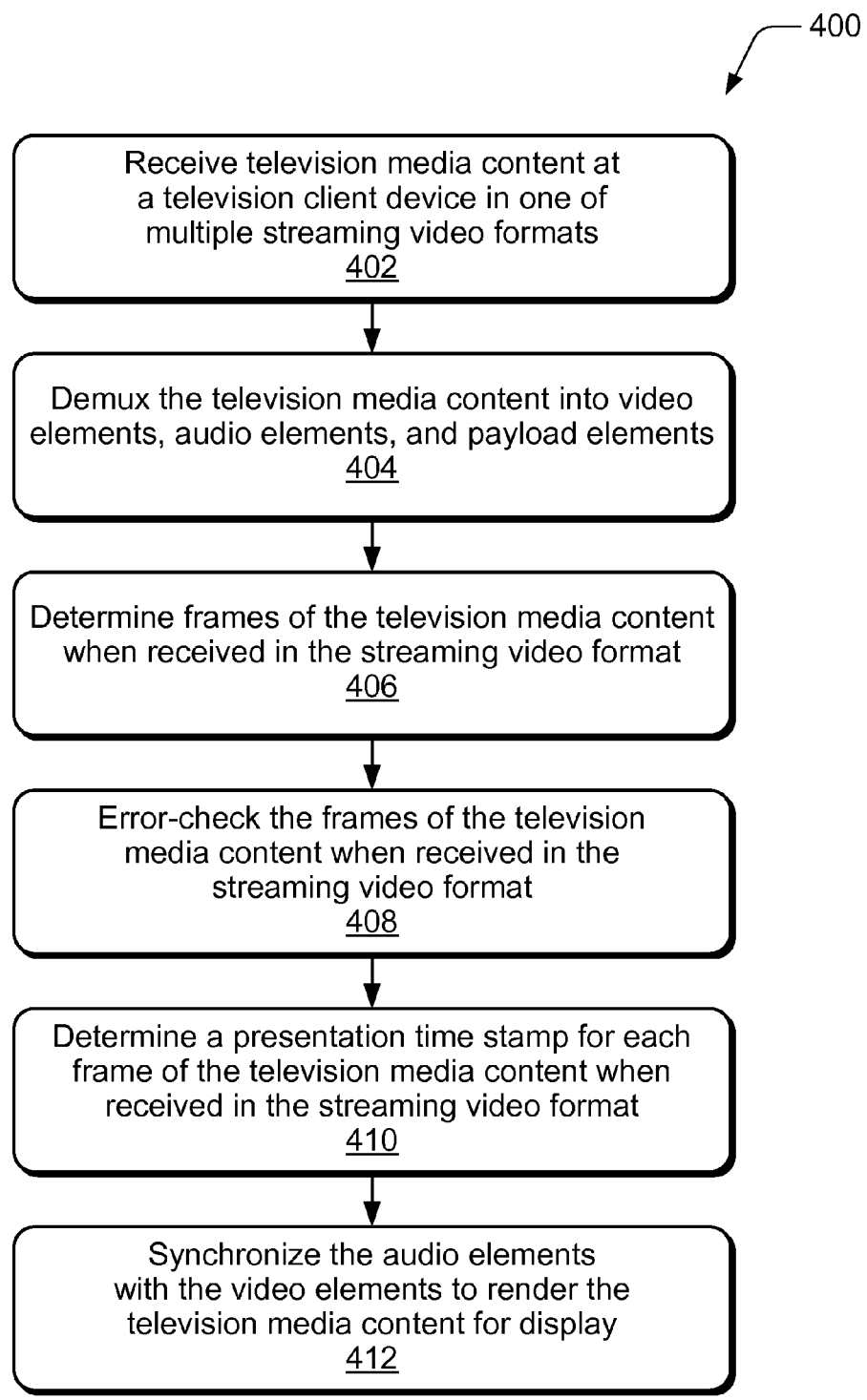
FIG. 4 illustrates example method(s) for television content from multiple sources in accordance with one or more embodiments.

FIG. 4 illustrates example method(s) 400 of television content from multiple sources. The order in which the method is described is not intended to be construed as a limitation, and any number of the described method blocks can be combined in any order to implement the method, or an alternate method.

At block 402, television media content is received at a television client device in one of multiple streaming video formats. For example, the television client device 102 (FIG. 1) receives television media content 132 in any one of multiple different streaming video formats from the television content distributor 116, an Internet video service 118, and/or any other television media content source 120. In various embodiments, the television media content can be received in an RTSP (real-time streaming protocol) delivery format, an HTTP (hypertext transfer protocol) delivery format, an H.264 video format, an MPEG-2 video format, and/or a VC1/WMV video format.

At block 404, the television media content is demuxed into video elements, audio elements, and payload elements. For example, the television media service 140 at television client device 102 includes a demux 212 (i.e., a demultiplexer) that demuxes or separates streaming media content into respective video elements, audio elements, and payload elements.

At block 406, frames of the television media content are determined when the television media content is received in the streaming video format. For example, the television media service 140 at television client device 102 determines the frame boundaries of the television media content that is received in the different streaming video formats.

At block 408, the frames of the television media content are error-checked when the television media content is received in the streaming video format. For example, the television media service 140 at television client device 102 error checks for frames of the television media content when received in the different streaming video formats, and initiates a request for missing data packets of video, audio, and/or payload elements.

At block 410, a presentation time stamp is determined for each frame of the television media content when received in the streaming video format. For example, the television media service 140 at television client device 102 determines the PTS (presentation time stamp) for each frame of the television media content that is received in an RTSP (real-time streaming protocol) delivery format.

At block 412, the audio elements are synchronized with the video elements to render the television media content for display. For example, the television media service 140 at television client device 102 processes the video frames and audio frames to synchronously render the streaming video content for display.

Figure 5:
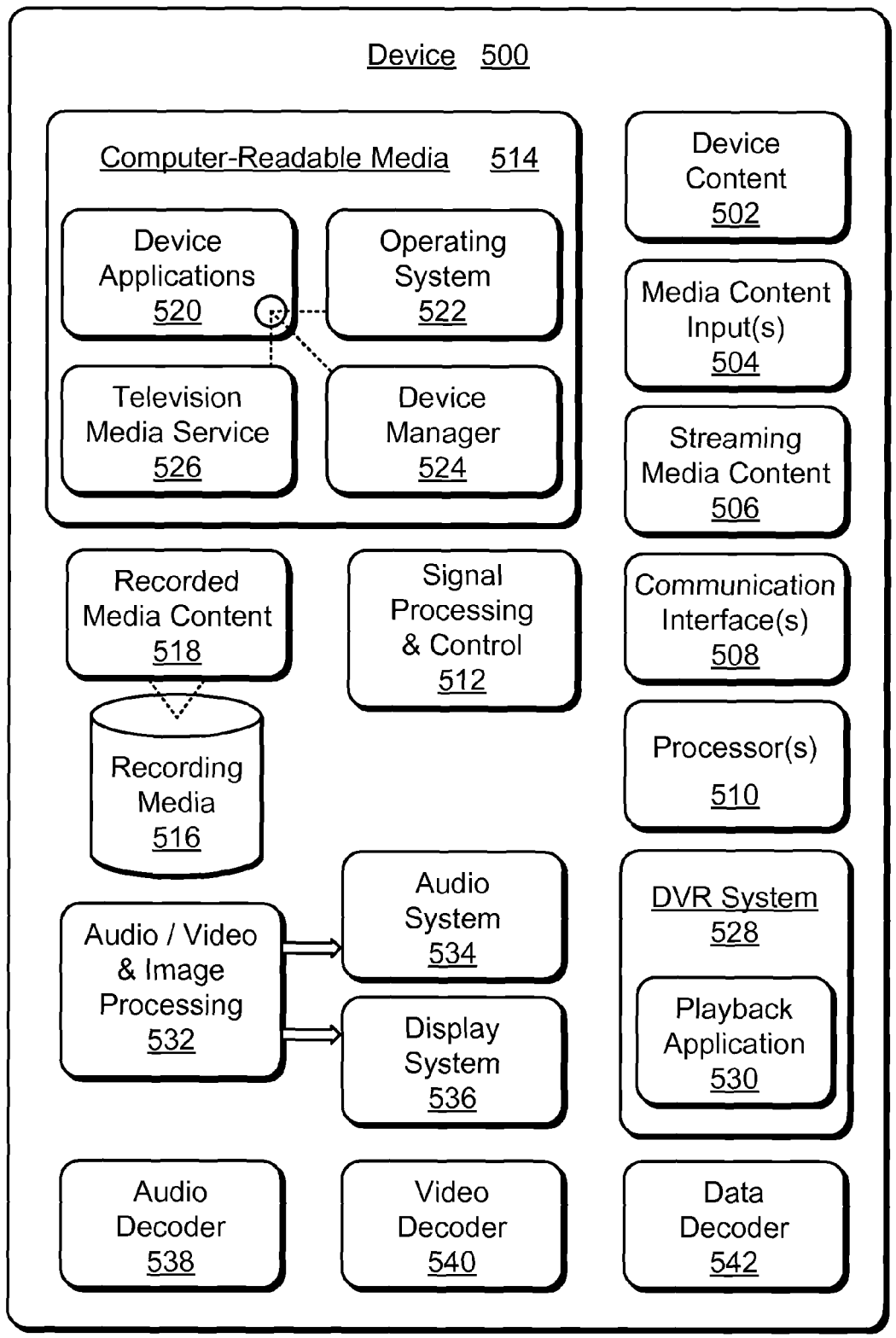
FIG. 5 illustrates various components of an example device that can implement embodiments of television content from multiple sources.

FIG. 5 illustrates various components of an example device 500 that can be implemented as any form of a television client device (e.g., a television set-top box, a digital video recorder (DVR), etc.), computing, electronic, appliance, and/or media device to implement various embodiments of a television content from multiple sources. For example, device 500 can be implemented as a television client device as shown in FIG. 1.

Device 500 can include device content 502, such as configuration settings of the device, media content stored on the device, and/or information associated with a user of the device (e.g., user profile data). Media content stored on the device 500 can include any type of data and audio, video, and/or image media content.

Device 500 can include one or more media content inputs 504 via which any streaming media content 506 (e.g., television media content) can be received in a streaming video format. In an embodiment, the media content inputs 504 can include Internet Protocol (IP) inputs over which streams of media content are received via an IP-based network. In other embodiments, the media content inputs 504 can include proprietary network inputs to receive video media content from a network server.

Device 500 further includes one or more communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices can communicate data with device 500.

Device 500 can include one or more processors 510 (e.g., any of microprocessors, controllers, and the like) which process various computer-executable instructions to control the operation of device 500 and to implement embodiments of television content from multiple sources. Alternatively or in addition, device 500 can be implemented with any one or combination of hardware, firmware, or fixed logic circuitry that is implemented in connection with signal processing and control circuits which are generally identified at 512.

Device 500 can also include computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like. Device 500 may also include a recording media 516 to maintain recorded media content 518 that device 500 receives and/or records.

Computer-readable media 514 provides data storage mechanisms to store the device content 502, as well as various device applications 520 and any other types of information and/or data related to operational aspects of device 500. For example, an operating system 522 can be maintained as a computer application with the computer-readable media 514 and executed on the processors 510. The device applications 520 can also include a device manager 524 and a television media service 526. In this example, the device applications 520 are shown as software modules and/or computer applications that can implement various embodiments of television content from multiple sources When implemented as a television client device, the device 500 can also include a DVR system 528 with a playback application 530 that can be implemented as a media control application to control the playback of recorded media content 518 and/or any other audio, video, and/or image device content 502 that can be rendered and/or displayed for viewing. The recording media 516 can maintain recorded media content that may include the streaming media content 506 when it is received from a content distributor and recorded. For example, the streaming media content 506 can be recorded when received as a viewer-scheduled recording, or when the recording media 516 is implemented as a pause buffer that records the streaming media content 506 as it is being received and rendered for viewing.

Device 500 can also include an audio, video, and/or image processing system 532 that provides audio data to an audio rendering system 534 and/or provides video or image data to a display system 536. The audio rendering system 534 and/or the display system 536 can include any devices or components that process, display, and/or otherwise render audio, video, and image data. The audio rendering system 534 and/or the display system 536 can be implemented as integrated components of the example device 500. Alternatively, audio rendering system 534 and/or the display system 536 can be implemented as external components to device 500. Video signals and audio signals can be communicated from device 500 to an audio device and/or to a display device via an RF (radio frequency) link, S-video link, composite video link, component video link, DVI (digital video interface), analog audio connection, or other similar communication link.

Device 500 can also include an audio decoder 538, a video decoder 540, and/or a data decoder 542. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Although embodiments of television content from multiple sources have been described in language specific to features and/or methods, it is to be understood that the subject of the appended claims is not necessarily limited to the specific features or methods described. Rather, the specific features and methods are disclosed as example implementations of television content from multiple sources.

The invention claimed is:

1. A method, comprising:
   receiving television media content in a first streaming video format, and receiving additional television media content in at least a different, second streaming video format;
   determining frames of the television media content when received in the first streaming video format to enable frame-by-frame processing of the television media content;
   setting properties for each of the frames of the television media content, the properties including at least a frame version number and a frame type for each of the frames of the television media content;
   processing the television media content frame-by-frame when received in the first streaming video format;
   rendering the television media content for display;

determining frames of the additional television media content when received in the different, second streaming video format to enable frame-by-frame processing of the additional television media content;

processing the additional television media content frame-by-frame when received in the different, second streaming video format; and rendering the additional television media content for display.

2. A method as recited in claim 1, wherein the television media content is received from a content distributor in the first streaming video format, and wherein the additional television media content is received from an Internet video service as the different, second streaming video format.

3. A method as recited in claim 1, further comprising error checking frames of the television media content when received in the first streaming video format, and error checking frames of the additional television media content when received in the different, second streaming video format.

4. A method as recited in claim 1, further comprising demuxing the television media content and the additional television media content into video elements, audio elements, and payload elements.

5. A method as recited in claim 4, further comprising:
  determining a PTS (presentation time stamp) for each frame of the television media content that is received in an RTSP (real-time streaming protocol) delivery format; and
  synchronizing the audio elements with the video elements to render the television media content for display.

6. A method as recited in claim 1, wherein the television media content is received in at least one of an RTSP (real-time streaming protocol) delivery format, an HTTP (hypertext transfer protocol) delivery format, an H.264 video format, an MPEG-2 video format, or a VC1/WMV video format.

7. A television client device, comprising:
  an interface configured to receive television media content in a first streaming video format, and receive additional television media content in at least a different, second streaming video format;
  a television media service configured to:
    determine frames of the television media content when received in the first streaming video format to enable frame-by-frame processing of the television media content;
    determine frames of the additional television media content when received in the different, second streaming video format to enable frame-by-frame processing of the additional television media content;
    process the television media content frame-by-frame when received from a first television content distributor in the first streaming video format, and render the television media content for display, the television media content processed by at least setting frame properties for each frame in the television media content, the frame properties including a frame version number and a frame type for each frame in the television media content; and
    process the additional television media content frame-by-frame when received from a second television content distributor in the different, second streaming video format, and render the additional television media content for display.

8. A television client device as recited in claim 7, wherein the second television content distributor is an Internet video service.

9. A television client device as recited in claim 7, wherein the television media service is further configured to error check frames of the television media content when received in the first streaming video format, and error check frames of the additional television media content when received in the different, second streaming video format.

10. A television client device as recited in claim 7, further comprising a demultiplexer configured to demux the television media content and the additional television media content into video elements, audio elements, and payload elements.

11. A television client device as recited in claim 7, wherein the television media service is further configured to determine a PTS (presentation time stamp) for each frame of the television media content that is received in an RTSP (real-time streaming protocol) delivery format.

12. A television client device as recited in claim 7, wherein the interface is further configured to receive the television media content in at least one of an RTSP (real-time streaming protocol) delivery format, an HTTP (hypertext transfer protocol) delivery format, an H.264 video format, an MPEG-2 video format, or a VC1/WMV video format.

13. One or more computer-readable storage media devices comprising computer-executable instructions that, when executed, initiate a television media service implemented in a television client device to:
  process television media content when received in a first streaming video format to determine frames of the television media content based on the first streaming video format;
  set one or more properties for the frames of the television media content, the one or more properties including at least a frame version number and a frame type for each of the frames of the television media content;
  render the television media content for display;
  process additional television media content when received in at least a different, second streaming video format to determine frames of the additional television media content based on the different, second streaming video format; and
  render the additional television media content for display.

14. One or more computer-readable storage media devices as recited in claim 13, further comprising computer-executable instructions that, when executed, initiate the television media service to process the television media content when received from a content distributor in the first streaming video format, and process the additional television media content when received from an Internet video service in the different, second streaming video format.

15. One or more computer-readable storage media devices as recited in claim 13, further comprising computer-executable instructions that, when executed, initiate the television media service to error check frames of the television media content when received in the first streaming video format, and error check frames of the additional television media content when received in the different, second streaming video format.

16. One or more computer-readable storage media devices as recited in claim 13, further comprising computer-executable instructions that, when executed, initiate the television media service to demux the television media content and the additional television media content into video elements, audio elements, and payload elements.

17. One or more computer-readable storage media devices as recited in claim 16, further comprising computer-execut able instructions that, when executed, initiate the television media service to:

determine a PTS (presentation time stamp) for each frame of the television media content that is received in an RTSP (real-time streaming protocol) delivery format; and synchronize the audio elements with the video elements to render the television media content for display.

18. One or more computer-readable storage media devices as recited in claim 13, wherein the one or more properties of each of the frames include a property that indicates the frame type is one of progressive or interlace.

19. One or more computer-readable storage media devices as recited in claim 13, wherein the one or more properties of each of the frames include properties that indicate at least one of user data, a sequence header, color format, or an indication of an audio frame or a video frame.

\* \* \* \* \*